United States Patent [19]

Jennins

[11] Patent Number: 5,605,178
[45] Date of Patent: Feb. 25, 1997

[54] LINEAR MOTOR VALVE

[75] Inventor: William S. Jennins, Warrington, United Kingdom

[73] Assignee: Electro Hydraulic Technology Limited, Warrington, United Kingdom

[21] Appl. No.: 392,874

[22] PCT Filed: Aug. 31, 1993

[86] PCT No.: PCT/GB93/01842

§ 371 Date: Mar. 2, 1995

§ 102(e) Date: Mar. 2, 1995

[87] PCT Pub. No.: WO94/05939

PCT Pub. Date: Mar. 17, 1994

[30] Foreign Application Priority Data

Sep. 3, 1992 [GB] United Kingdom ............ 9218610

[51] Int. Cl.$^6$ ............................................. F15B 13/044
[52] U.S. Cl. ............................ 137/625.651; 251/129.15
[58] Field of Search ................. 137/625.65; 251/129.15

[56] References Cited

U.S. PATENT DOCUMENTS

| 4,140,152 | 2/1979 | Budzich | 137/596.2 |
|---|---|---|---|
| 4,525,695 | 6/1985 | Sheng et al. | 137/625.65 X |
| 4,635,683 | 1/1987 | Nielsen | 137/625.65 |
| 4,655,254 | 4/1987 | Hafner et al. | 137/625.65 |
| 4,664,136 | 5/1987 | Everett | 251/129.15 |
| 4,744,389 | 5/1988 | Ichihashi | 137/625.65 |
| 4,809,749 | 3/1989 | Ichihashi | 137/625.65 |
| 4,947,893 | 8/1990 | Miller et al. | 137/625.65 |
| 5,036,885 | 8/1991 | Miura | 137/625.65 |
| 5,156,184 | 10/1992 | Kolchinsky | 137/625.65 X |
| 5,249,603 | 10/1993 | Byers | 137/625.65 |

FOREIGN PATENT DOCUMENTS

| 254483 | 1/1988 | European Pat. Off. | 137/625.65 |
|---|---|---|---|
| 2-138583 | 5/1990 | Japan | 137/625.65 |
| 2186349 | 8/1987 | United Kingdom | 137/625.65 |

Primary Examiner—Gerald A. Michalsky
Attorney, Agent, or Firm—Salter & Michaelson

[57] ABSTRACT

A linear motor valve consists of a linear motor having a stator and an armature and a valve including a valve body housing a valve spool. The armature defines a magnetic bore through which hydraulic fluid leakage from the valve moves as the armature reciprocates. Magnetic debris is retained within the bore of the armature thereby precluding its movement to the other parts of the hydraulic circuit in which the valve is used.

10 Claims, 1 Drawing Sheet

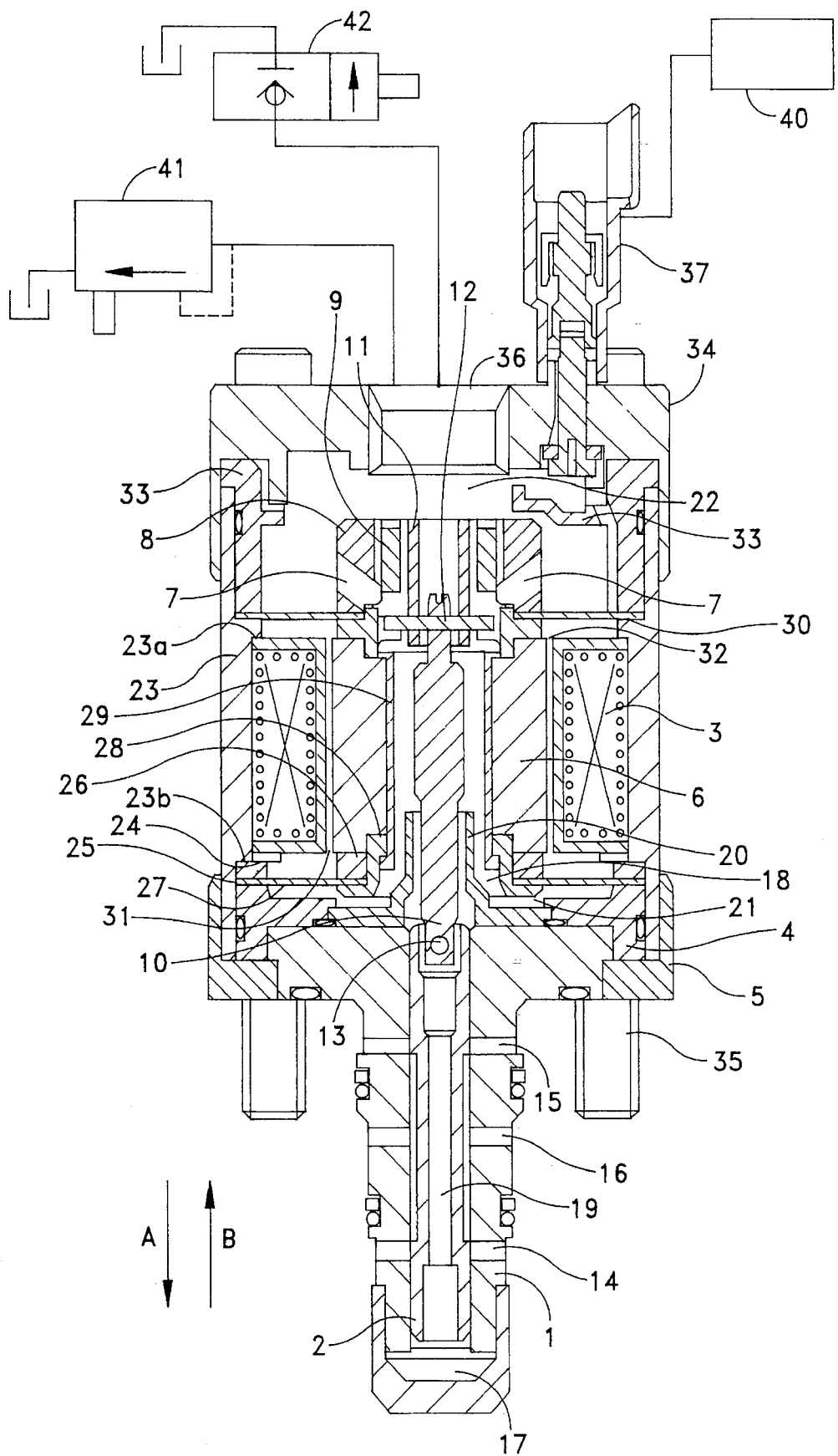

LINEAR MOTOR VALVE

This invention relates to an hydraulic control valve, wherein the spool is driven by a linear force motor. The valve is for controlling the flow of hydraulic fluid, particularly for use in electronically controlled suspensions and gearboxes on motor vehicles.

Hydraulic control valves for motion control are typically used for the control of an actuator in two directions, and with a requirement for a neutral or null position to hold the actuator in a specific position. Conventionally the valve is designed such that the neutral position is between the two positions used for the control of motion, and that the spool of the valve returns to that position when there is no electrical power. The use of a linear force motor to drive the spool provides this configuration, and uses one set of windings to provide the two directions of movement. In order to maintain a satisfactory level of cleanliness in the armature chamber, typically seals are provided in the valve body around the spool, in order to prevent the ingress of debris (particularly magnetic debris) into the armature chamber. The provision of such seals increases the friction when the spool moves, to the detriment of the valve performance.

In the valve described in EP-A-0157630 a magnetic pin is disposed at the entry to the armature chamber to collect magnetic debris in fluid. This adds to the expense of the valve, does not provide a particular large magnetic surface area for attracting magnetic debris and if the magnetic debris escape there is no second chance.

We have now devised a valve for controlling the flow of hydraulic fluid (which valve is hereinafter referred to for convenience as a "linear motor valve") which is less susceptible to the ingress of foreign debris, which has fewer components and tends to have a smaller envelope size than the aforementioned conventional such valves.

According to the present invention, there is provided a linear motor valve adapted to be controlled by a reversible electrical current comprising a valve body defining a valve chamber, an armature defining a magnetic bore disposed in the valve chamber, a valve spool extending into the bore, a stator which is rigidly mechanically linked to but not in magnetic connection with the valve body, characterised in that the spool and armature are arranged so that only a minor part of flow through the valve enters the chamber containing the armature and that minor is in fluid flow connection with the bore of the armature whereby magnetic debris in that minor part is retained in the magnetic bore.

In the linear motor valve according to the present invention substantially the only fluid flow into the armature chamber is that due to spool leakage, and typically this leakage would not be more than 2% of the full flow of the valve. The leakage from the spool is directed towards a midpoint within the armature bore, thereby positioning the fluid such that it has to pass through the magnetic field of the armature before it can reach either end of the armature. It will be appreciated that the fluid within the armature will reciprocate from end to end of the chamber as the valve operates, and that during each reciprocal movement the said fluid will be subjected to the magnetic force within the armature. By this means the fluid within the armature chamber will achieve a high level of cleanliness from magnetic debris. The magnetic debris will be retained within the bore of the armature, thereby precluding its movement to other parts of the hydraulic circuit in which the linear motor valve is used. The adjustment mechanism, to position the spool in relation to the valve body to give the required characteristics in null, is designed and positioned such that there is still free flow of fluid between the two ends of the armature, whilst utilising a design of adjustment mechanism that provides fine control, and is clear of the part that directs the leakage from the spool towards a mid-point within the armature bore, as aforementioned.

While we do not exclude the possibility that the electrical current which controls and drives the linear motor valve is generated by conventional means, preferably the current is generated by a signal from a device such as a microprocessor, more preferably utilising an input signal that includes a wave form which reverses when the valve is in the null position. The use of this preferred wave form assists in returning the armature (and thus the spool) to the null position by inducing a dither or minute vibration when the effective current is zero. The effective current is zero because the wave form on either side of the zero power line is equal and opposite. Typically, the dither is maintained during the working stroke of the valve by the electrical drive being pulse width modulated, which would run at a frequency determined by a man skilled in the art. This electrical drive system ensures that the armature and spool throughout their stroke (but particularly at the null position where accurate positioning of the spool is important to the correct functioning of the valve) are accurately positioned. In the preferred embodiment more than one pulse width modulation frequency would be used, with a higher frequency being used for rapid operation of the linear motor valve, and a lower frequency being used very shortly after the last change of input signal. The aforementioned dither reduces inter alia the hysteresis of the valve, and dither at the null position enables the spool overlap to be reduced, which, it is believed, increases the responsiveness of the valve and reduces the total spool travel required.

It will be appreciated that the number and size of the ports will be chosen in the light of inter alia the requirements of the hydraulic circuit. Typically, up to 5 ports can be incorporated in the linear motor valve. A man skilled in the art will determine a suitable spool and body design to meet the requirements of the differing number of ports.

Where 3 ports are used, when the valve is stationary but is being used to hold a load on the service line, then the return to tank line from the linear motor valve can be blocked thereby ensuring that the only leakage from the service line is that to the case drain. When the linear motor is used for the control of suspensions on motor vehicles the service line would typically be connected to the suspension strut. When the vehicle is stationary and the engine switched off, the pressure generated in the case drain will equate to the pressure generated in the strut by the static weight of the vehicle. The case drain line would be fitted with a low pressure relief valve which will have two pressure settings. The higher of the two settings will be similar to or higher than the pressure generated by the static weight of the vehicle, and the lower setting will be as near to atmospheric pressure as is practical. In this manner the linear motor according to the present invention will hold up the vehicle whilst the engine is stopped and the vehicle is stationary, but with reduced case drain pressure when the linear motor valve is operational.

When the linear motor is used for the control of suspensions on motor vehicles the service line 16 would typically be connected to the suspension strut. Typically, the strut would also be connected to a gas spring (sometimes referred in the art as an "accumulator") via a damper orifice. The pressure in the strut will vary according to the weight of the vehicle, and any aerodynamic downforce due to the forward motion of the vehicle, and the pressure generated due to the flow through the damper orifice. The changes in strut pressure can be significant. The changes in strut pressure changes the pressure differential across the ports of the linear motor valve, which typically would alter the flow rate through the valve. The changes in flow rate will inter alia, change the characteristics of the damper orifice, and thereby changing the damping characteristics of the vehicle. In order to significantly reduce the alteration of flow rate due to the change in pressure differential, the spool is designed to enhance the effect of the flow forces, which will move the spool towards the null position as the pressure differential increases, thereby reducing the change in flow rate through the valve due to changes in strut pressure.

It will be appreciated that the armature and the spool will have to move together axially, but that the spool must be capable of floating radially in relation to the axis of the armature, to allow free movement of the spool within the valve body. A pinned link is provided, between the adjustment mechanism in the end of the armature furthest from the valve body, and the spool. The design of the linage is such that the spool may move radially in relation to the armature, and the side load transmitted to the spool is negligible.

The stator and the armature have to be mounted in the liner motor assembly such that there is an air gap between them, and the air gap has to be uniform around its circumference and its length. As will be described in more detail hereinafter in relation to the drawing, the air gap is preset by probes at both ends of the armature at three places around the circumference, which can be left in place whilst the adhesive sets to position the springs in the position required to provide the required air gap. In an alternative embodiment, the air gap can be measured by a non-contact measuring device, and the armature located by a micro-processor controlled device to provide to correct air gap whilst the adhesive sets to position the springs. The design of the springs and end covers is such that they provide entry points for the probes at three positions on the circumference at each end of the armature.

The linear motor valve is preferably in cartridge valve format, but we do not exclude the possibility that it may be in an alternative format, such as a manifold mounted unit.

In order that the invention may be more clearly understood, one embodiment thereof will now be described, by way of example, with reference to the single FIGURE of the accompanying drawing which shows a linear motor valve according to the invention in part longitudinal section.

Referring to the drawing the linear motor valve comprises a linear motor 3 and a valve.

The valve comprises a valve body 1 defining a chamber 17, in which is disposed a valve spool 2, which is operative to move axially within the chamber 17 of the valve body 1. The linear motor 3 comprises a stator which is in indirect permanent rigid mechanical linkage with the valve body 1 via a non-magnetic spacer 4 and a non-magnetic mounting plate 5, and an armature 6 which is mechanically linked to the spool 2 so as to drive it axially, which defines an armature bore and which is disposed in an armature chamber. The motor is supplied with electrical current from a microprocessor 40.

A null adjustment mechanism comprising an adjustment housing 8 is incorporated in the end of the armature 6 furthest from the valve body 1. Fluid passageways 7 are incorporated in the adjustment housing 8 of the null adjustment mechanism, which allow fluid to pass from one end of the bore to the other. Fine adjustment is provided between the armature 6 and the spool 2 by means of a dual pitch outer adjustment screw 9. A link 10/inner adjustment screw 11 and the armature 6/adjustment housing 8 are mechanically interconnected by means of a pin 12, which prevents the rotation of one relative to the other. As the outer adjustment screw 9 is rotated, it moves the link 10/inner adjustment screw 11 axially in relation to the armature 6/adjustment housing 8 by an amount equivalent to the difference between the pitch of the screw threads. The axial movement of the link 10, moves the spool 2 axially by the same amount, and the null position of the spool 2 is thereby adjusted in relation to the valve body. Pin 12 and pin 13 are normal one to the other, thereby providing a universal joint in the drive from the armature 6 to the spool 2 via link 10.

The linear motor valve incorporates a pressure port 14, tank port 15 and service port 16 and is shown in the null position. Pressure port 14 and the tank port 15 are both closed, and therefore there is no flow into or out of the service port 16.

In operation, when the valve spool 2 is moved in the direction of arrow 'A', the pressure port 14 becomes uncovered, and fluid flows from pressure port 14 to service port 16. Conversely, as the valve spool 2 moves in the direction of arrow 'B', the tank port 15 becomes uncovered, and there is fluid flow from service port 16 to tank port 15. When the linear motor valve is in operation, there will be a small internal leakage (often referred to in the art as a "case drain leakage") along the spool from pressure port 14 towards chamber 17, and from port 15 towards a chamber 18. The case drain leakage from chamber 17 passes through a hole 19 in the valve spool 2 into the chamber 18. The combined leakage from chambers 17 and 18 and passes along the link 10, within a surrounding sleeve 20, towards the centre of the bore of the armature 6. As the linear motor valve is operated, the armature moves and reciprocates within the armature chamber. This reciprocal movement will move the hydraulic fluid between chambers 21 and 22 disposed at opposite ends respectively of the armature through the bore in the armature and the adjustment mechanism. The fluid will be subjected to the magnetic force from the bore of the armature, as discussed hereinbefore.

In the preferred design the armature and the stator are the same length. This feature produces a magnetic edge effect across the coincident ends of the motor that retains the armature centrally within the stator when there is zero effective current in the windings.

The stator is retained within a tube 23 and the end of the stator furthest from the valve body 1 abuts against a shoulder 23a of the tube 23. To make due allowance for manufacturing tolerances, a wave spring 24 is fitted at the end of the stator nearest to the valve body. When assembled this wave spring 24 is compressed by distance piece 25, firmly retaining the stator 3 in its position along the tube 23, and the stator 3 is located within the bore of the tube 23.

At the end of the armature nearest to the valve body 1, a distance piece 26, a spring 27 and a retaining cup 28 are riveted to the armature by a thin walled non-magnetic rivet 29. The spring is therefore fixed in relation to the outside diameter of the armature 6. At the end of the armature furthest from the valve body 1, screws (not shown on the drawing) are used to clamp the adjustment housing 8, a spring 30 and the distance piece to the armature 6. The spring 30 is therefore fixed in relation to the outside diameter of the armature 6.

Three probes are placed into air gap 31 through the spaces provided in spring 27 and within the bore of spacer 4. Adhesive on the spring 27 is hardened whilst spacer 4 is clamped towards the shoulder 23b of tube 23. After the probes have been removed, sleeve 20, valve body 1 and the non-magnetic mounting plate 5 are fitted, with the clamp load being maintained through the valve body 1, as required. At the end of the motor furthest from the valve body 1, three probes are placed into the air gap 32 through the spaces provided in spring 30 and the spaces provide in the inner cover 33. Adhesive on the spring 30 is hardened whilst the inner cover 33 is held against tube 23. After the probes have been removed, end cover 34 is fitted.

The stator 3 and the associated parts of the linear motor casing are held together by the four mounting screws 35, after the linear motor valve has been fitted into its mounting cavity (not shown). To maintain the integrity of the assembly prior to its fitting to its mounting cavity (not shown), adhesives are used to hold the end cap 34 to the sleeve 23 and the non-magnetic mounting plate 5 to the other end of the sleeve 23. The stator (and the armature therein) with the end cap 34 and the non-magnetic mounting plate 5 form a chamber capable of the retention of hydraulic fluid. The mounting screws 35 are provided to clamp the end cap 34 to the non-magnetic mounting plate 5 with the stator elements 3 between, retaining the stator in its correct position, and holding the linear motor valve in the mounting cavity (not shown). There is a low pressure hydraulic connection 36, to allow fluid to return to the hydraulic tank or reservoir in the hydraulic circuit, via the low pressure relief valve 41 when used in suspension systems as discussed hereinbefore. This low pressure relief valve 41 has two pressure settings, a first related to the static weight of a vehicle to which the valve is fitted, and a second close to atmospheric pressure. Means 42 are provided for blocking the return to tank line to ensure that the only leakage from the service line is to the case drain line when the valve is stationary but is being used to hold a load on the service line. The electrical connector 37 forms a fluid tight seal and allows the electrical connections from the stator 3 windings to pass through the wall of the pressure chamber.

It will be appreciated that the above embodiment has been described by way of example only and that many variations are possible without departing from the scope of the invention.

I claim:

1. A linear motor valve adapted to be controlled by a reversible electrical current comprising a valve body (1) defining a valve chamber (17), a stator (3) which is rigidly mechanically linked to but not in magnetic connection with the valve body (1), an armature (6) disposed for axial movement within the stator, said armature defining an axial magnetic bore, a valve spool (2) disposed in the valve body and being arranged to be driven by the armature, characterized in that the spool (2) and armature (6) are arranged so that only a minor part of flow through the valve due to spool leakage enters the chamber containing the armature via a sleeve (20) leading from an intermediate chamber (18) and further being characterized in that the flow is reciprocated within the bore between the chambers (21 and 22) disposed at opposite axial ends of the armature as the armature reciprocates within the stator whereby any magnetic debris remaining suspended in the said minor part of the flow will be continually subjected to the magnetic force within the armature during each and every reciprocal movement, and the magnetic debris remains within the bore of the armature being precluded from any further movement to any other part by retention by the magnetic field of the armature.

2. A linear motor valve as claimed in claim 1, in which an adjustment mechanism is provided to position the valve spool (2) in relation to the valve body (1).

3. A linear motor valve as claimed in any preceding claim 1, in which means are provided for generating an electrical current signal having a waveform which reverses when the valve is in the null position to induce a dither when the effective current is zero in order to assist in returning the armature (6) to the null position.

4. A linear motor valve as claimed in claim 3, in which the electrical current signal is pulse width modulated.

5. A linear motor as claimed in claim 4, in which means for generating are operative to supply a higher pulse width modulation frequency is used for rapid operation and a lower pulse with modulation frequency shortly after the last change of input signal.

6. A linear motor valve as claimed in claim 1 further comprising a service line and a case drain line and means for blocking the return to tank line to ensure that the only leakage from the service line is to the case drain when the valve is stationary but is being used to hold a load on the service line.

7. A linear motor valve as claimed in claim 6, in which the case drain line is fitted with a low pressure relief valve having two pressure settings a first related to a static weight of a vehicle to which the valve is fitted and a second close to atmospheric pressure.

8. A linear motor valve as claimed in claim 1, in which the valve spool (2) is formed to move towards the null position as a pressure differential across the valve increases.

9. A linear motor valve as claimed in claim 1, in which an adjustment mechanism is connected to the valve spool (2) via a pinned link (10, 12).

10. A linear motor valve as claimed in claim 1, in which the stator and armature (6) are separated by a uniform air gap.

* * * * *